March 2, 1954  L. K. FONDRIEST ET AL  2,670,861
GRAVITY UNLOADING APPARATUS FOR VEHICLES
Filed May 26, 1950
2 Sheets-Sheet 1
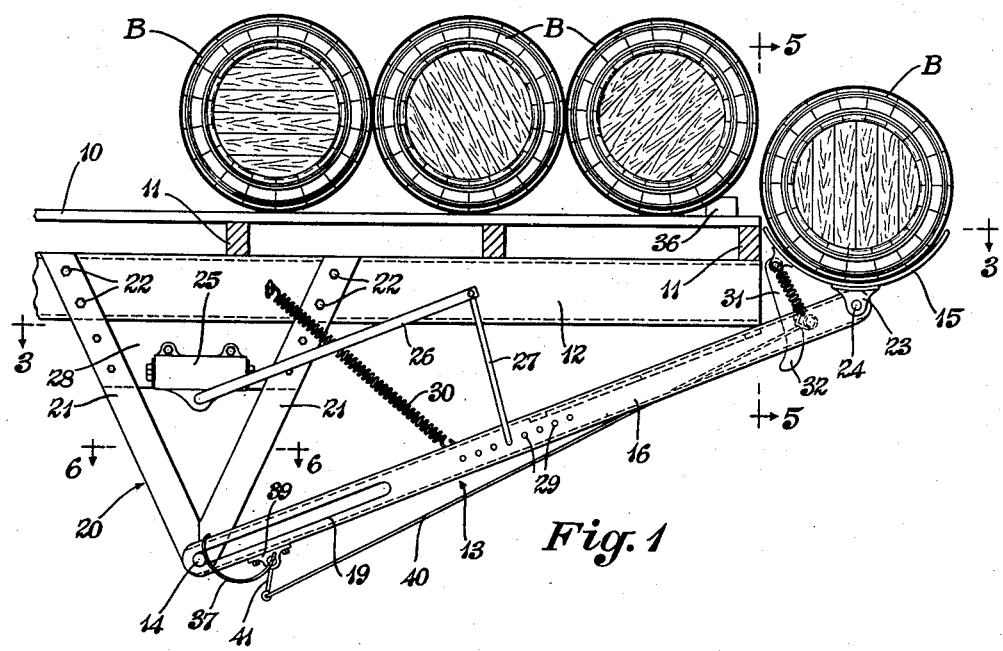
Fig. 1
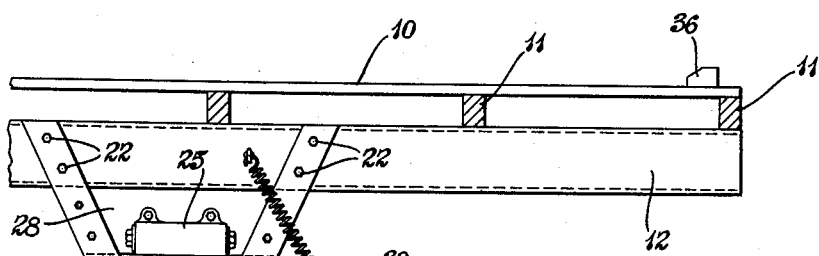
Fig. 2
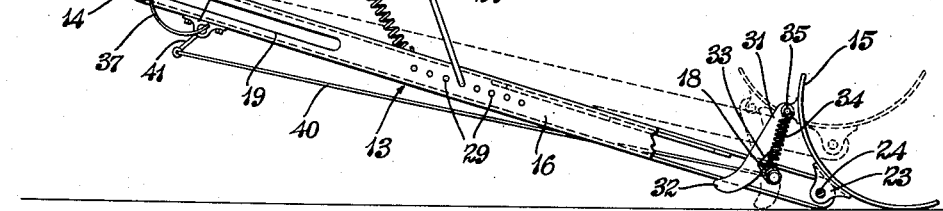
INVENTORS
Leo K. Fondriest and
James E. Fondriest
BY Frease and Bishop
ATTORNEYS March 2, 1954    L. K. FONDRIEST ET AL    2,670,861
GRAVITY UNLOADING APPARATUS FOR VEHICLES
Filed May 26, 1950    2 Sheets-Sheet 2
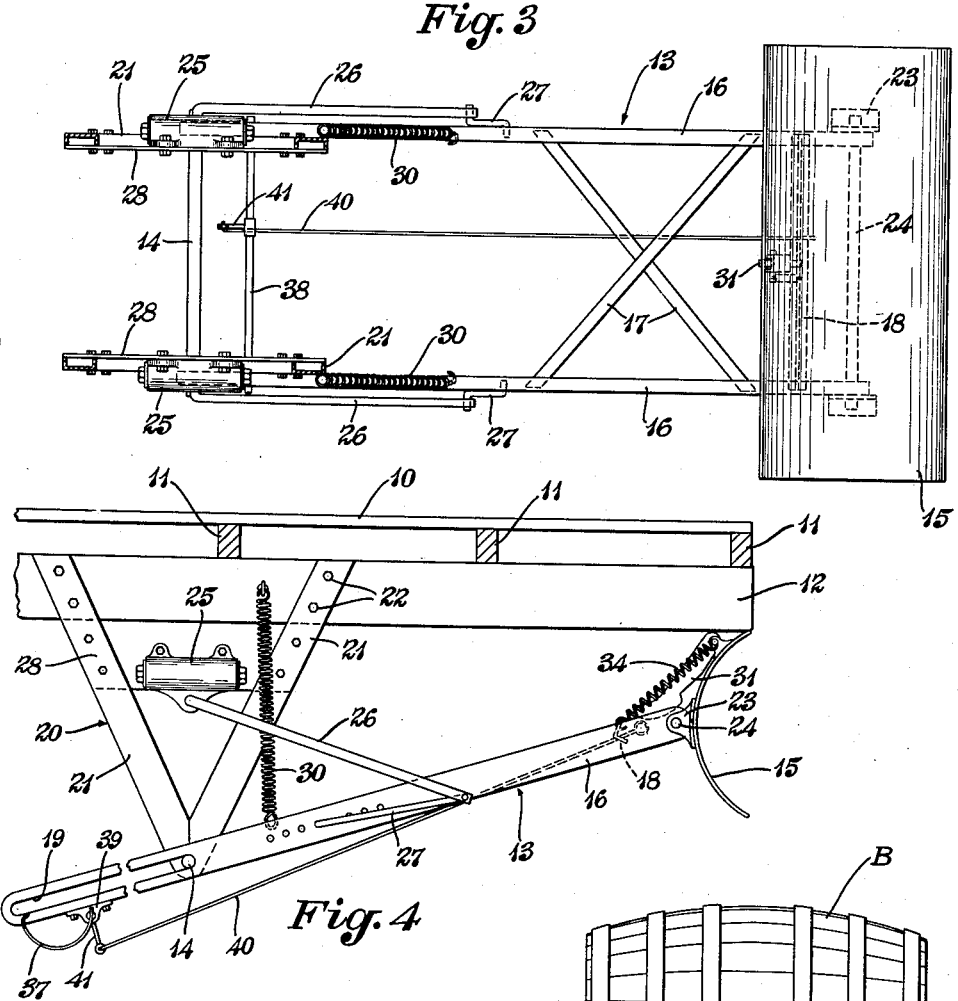
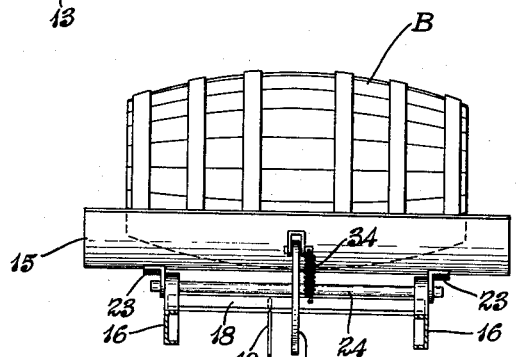
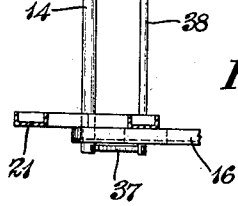
INVENTORS
Leo K. Fondriest and
James E. Fondriest
BY *Frease and Bishop*
ATTORNEYS Patented Mar. 2, 1954

2,670,861

UNITED STATES PATENT OFFICE 2,670,861

GRAVITY UNLOADING APPARATUS FOR VEHICLES

Leo K. Fondriest and James E. Fondriest, Dover, Ohio

Application May 26, 1950, Serial No. 164,326

5 Claims. (Cl. 214—77)

The invention relates generally to apparatus for loading material from an elevated platform, and more particularly to novel apparatus for unloading heavy objects such as barrels and drums from the platform of a truck or similar vehicle.

In unloading heavy articles such as barrels or drums from trucks and the like, where there is no elevated platform on which to unload there is a drop of several feet from the truck platform to the ground or pavement, and usually only one man is available to do the unloading. In such cases the articles unloaded are allowed to fall wholly or partially of their own weight, and are accordingly subjected to severe shocks and impacts.

Beer trucks are often provided with bumper pads of resilient material on which the beer kegs are intended to be dropped in order partially to cushion the shocks, but these pads are used at the whim of the driver and fall far short of providing a satisfactory solution to the difficulty.

Certain prior loading and unloading devices for vehicles have included winch means, either hand or motor driven, for operating the device to load or unload material. These devices have been expensive to build and add excessive weight to the vehicle. Moreover, where these devices are hand operated, they require extra time and labor, and where they are motor operated, they add considerable expense.

It is an object of the present invention to provide a novel and improved unloading device for unloading heavy objects from an elevated vehicle platform without subjecting said objects to bumps or shocks.

Another object is to provide novel gravity unloading apparatus for lowering heavy objects from a vehicle platform to the ground without requiring hand-operated or motor-operated power means.

A further object is to provide a novel unloading apparatus which is mounted under and normally projects beyond the vehicle platform, but is easily retractable when not in use.

Another object is to provide a novel unloading apparatus which is automatically operated by the gravity of the object to be lowered gradually and automatically unloads the object when it reaches the ground.

A still further object is to provide a novel unloading apparatus having means automatically raising the same for another operation when the load has been unloaded therefrom.

Finally, it is an object to provide novel and improved unloading apparatus which is simple and inexpensive to manufacture, which is easily attachable to any standard vehicle platform, and which is easily operated by an unskilled person without labor or tools.

These and other objects are accomplished by the parts, improvements, constructions and combinations comprising the present invention, a preferred embodiment of which is shown in the accompanying drawings as exemplifying the best known mode of carrying out the invention, the invention being described in detail in the specification and the scope of the invention being set forth in the appended claims.

In general terms, the novel apparatus comprising the present invention consists of a swinging boom pivoted on a frame under the vehicle platform and having a load-carrying cradle on the outer end of the boom normally positioned adjacent to the edge of the platform with the boom raised, there being hydraulic check means for slowly lowering the boom in response to the gravity of the load on the cradle and spring means for automatically raising the boom when unloaded, the cradle being adapted to unload by tilting automatically when striking the ground, and the boom being selectively retractable under the platform when not in use.

Referring to the drawings forming part hereof, in which a preferred embodiment of the invention is shown by way of example;

Figure 1 is a side view of the rear end of a vehicle platform showing the novel unloading apparatus mounted thereon in raised position;

Fig. 2 is a similar view showing the unloading apparatus in lowered position with the cradle tilted;

Fig. 3 is a fragmentary plan sectional view as on line 3—3, Fig. 1;

Fig. 4 is a view similar to Fig. 1 showing the unloading boom in retracted positon;

Fig. 5 is a fragmentary sectional view as on line 5—5, Fig. 1; and

Fig. 6 is a fragmentary plan sectional view as on line 6—6, Fig. 1.

Similar numerals refer to similar parts throughout the several views of the drawings.

In Figs. 1, 2 and 4, the rear end portion of a truck platform is shown at 10 supported in usual fashion on cross beams 11 resting on longitudinal sills or girders 12 which are carried by springs on the usual axles and wheels (not shown). The platform 10 is shown in Fig. 1 as carrying a plurality of barrels B, but it will be understood that the platform may carry oil drums or kegs or other heavy objects such as cartons or boxes, to be unloaded by the novel unloading apparatus comprising the present invention.

The novel unloading apparatus preferably includes a boom indicated generally at 13 which is pivotally mounted at its inner end on a pivot shaft 14 and extends rearwardly beyond the rear end of the platform for supporting a load-carrying cradle 15 at its outer end. Preferably, the boom 13 consists of laterally spaced longitudinally extending channels 16 connected intermediate their ends by cross braces 17, and connected adjacent their outer or rear ends by a transverse angle 18.

The front inner end portions of the channels 16 have longitudinal slots 19 therein, and the ends of the pivot shaft 14 are received in said slots. As shown in Figs. 1 and 2, the ends of the pivot shafts 14 are normally positioned at the front ends of the slots 19 adjacent the inner ends of the channels 16. The pivot shaft 14 is preferably mounted at the bottom end of a V-shaped frame indicated generally at 20 supported on and depending from the sill members 12 of the truck platform. The frame 20 may consist of laterally spaced pairs of channels 21 connected as by bolts 22 to the sills 12, and each pair of channels 21 being connected together at their bottom ends at the apex of the V where the pivot shaft 14 is mounted.

The cradle 15 may be a curved or arcuate steel plate which is pivotally mounted on the outer extended ends of the boom channels 16 by means of brackets 23 mounted on a pivot shaft 24 which extends through the outer ends of the channels 16. The cradle 15 is preferably arcuate in shape for unloading substantially cylindrical objects such as the barrels B, but it will be understood that the shape of the cradle may be changed to conform to heavy objects of various shapes, as desired.

When a barrel B is rolled onto the cradle 15 in the location of Fig. 1, the mass or gravity of the barrel will exert a downward force to swing the boom 13 downwardly to the position of Fig. 2. Means for checking the downward movement of the boom so as to lower the same gradually and substantially prevent any shock when the boom strikes the ground or pavement, preferably includes a pair of hydraulic cylinders 25 one on each side of the boom, which operate levers 26 connected by links 27 to intermediate portions of the boom. Preferably the cylinders 25 are mounted on supporting plates 28 which may be bolted or otherwise connected to the channels 21 of the V-frames.

The hydraulic cylinder is a single acting cylinder of usual construction and contains a piston which is geared to the lever arm 26 and operated by fluid pressure so as to check the downward movement of the boom 16 and lower it gradually, and so as to allow upward movement of the boom without any resistance. The links 27 may be connected to the channels 16 of the boom at any one of a number of pivot holes 29 for adjustment purposes.

The means for returning the boom to its normal upper position shown in Fig. 1 preferably consists of a pair of strong tension springs 30 connected at their lower ends to intermediate portions of the channels 16, and which may be connected at their upper ends either to the sills 12 or the channel frame members 21, and preferably to the sills as shown.

The means for automatically tilting the cradle when the outer end of the boom strikes the ground preferably includes a trip lever 31 pivoted to the inner side of the cradle, and having a depending foot 32 which is adapted to engage the ground as shown in dotted lines in Fig. 2 for tilting the cradle to the full line position. The trip lever 31 is preferably notched as shown at 33 and is pivoted off center so as to engage the transverse angle 18 and when the cradle is in its normal upright position as shown in Fig. 1, in order to prevent the cradle from tilting in this position.

In the position of Fig. 2, when the engagement of the foot 32 with the ground has tilted the cradle 15 to automatically unload the barrel, the cradle is returned toward horizontal position by a light spring 34 until the notch 33 engages the angle 18. The spring 34 may be connected at one end to the transverse angle 18 and at the other end to the pivotal connection 35 between the lever 31 and the cradle 15. As the boom 16 is raised by the springs 30, the cradle returns to horizontal position and when the boom is fully raised the angle 18 again drops into the notch 33 of the lever 31.

Thus the barrels B may be unloaded one at a time from the elevated platform 10 of the truck, merely by rolling the end barrel over a stop or chock 36 which may be provided at the rear end of the truck platform. When a barrel is rolled onto the cradle 15 the weight of the barrel will lower the boom gradually because the downward movement is hydraulically checked by the fluid in the cylinder 25, and the weight of the barrel maintains the cradle in horizontal position. When the boom strikes the ground the foot 32 of trip lever 31 will tilt the cradle to roll the barrel off the same, whereupon the spring 34 will partly return the cradle and lock the trip lever 31 and springs 30 will immediately raise the boom and return the cradle to horizontal position. The upward movement of the boom is limited by the engagement of the boom with the sill members 12, and the cradle is then in position ready to unload another barrel.

For the purpose of retracting the boom to the position of Fig. 4 when not in use, a pair of curved latch bars 37 are provided, one normally abutting each end of the pivot shaft 14 for holding it at the outer end of the slots 19. The upper ends of the latches 37 are secured to the outer ends of a pivot shaft 38 journaled in brackets 39 on the channels 16 of the boom. An operating rod 40 is attached at its lower end to a bracket 41 fixed on the pivot shaft 38, and the upper end portion of the operating rod 40 may be slidably engaged in the transverse angle 18 with a pull loop on its extreme end.

Accordingly, when it is desired to retract the boom under the platform to the position of Fig. 4, the operator pulls the rod 40 upwardly to rotate the latches 37 and release them from engaging the pivot shaft 14. The boom then may be pushed inwardly of the platform by sliding the channels 16 inwardly on the pivot shaft 14, and releasing the trip lever 31 and rotating the cradle 15 on its pivot shaft 24 so that one end is engaged under the sills 12, in the position shown in Fig. 4. When it is desired to put the unloading device into use, all that is necessary is to pull the boom outwardly until the pivot shaft 14 engages the lower end of the slots 19 and then return the latches 37 to the position of Fig. 1, whereupon the device is ready for the unloading operation.

The novel unloading apparatus is adapted to unload heavy objects by gravity without subjecting them to bumps or shocks and without requiring any hand-operated or motor-operated power means. The device is simple and inexpensive to manufacture and is easily attached to any standard vehicle platform for successful operation by unskilled persons.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use of a preferred embodiment thereof, and the advantageous new and useful results obtained thereby; the new and useful constructions, and reasonable mechanical equivalents thereof obvious to those skilled in the art, are set forth in the appended claims.

We claim:

1. In a vehicle having a platform, unloading apparatus including a depending frame mounted on the underside of said platform, an elongated unloading boom pivoted at one end on the lower end of said frame and having its other end extending laterally beyond said platform with its intermediate portion under said platform, a cradle pivotally mounted intermediate its sides on the extended outer end of said boom, means normally holding the cradle in horizontal position, means on the cradle for engaging the ground to tilt the cradle outwardly when the boom is lowered, hydraulic check means operatively connected between said boom and said platform for causing gradual lowering of the boom by gravity when loaded, and spring means connected between said boom and said platform elevating the boom when unloaded.

2. In a vehicle having a platform, unloading apparatus including a depending frame mounted on the underside of said platform, an elongated unloading boom pivoted at one end on the lower end of said frame and having its other end extending laterally beyond said platform with its intermediate portion under said platform, a cradle pivotally mounted intermediate its sides on the extended outer end of said boom, means normally holding the cradle in horizontal position, means on the cradle for engaging the ground to tilt the cradle outwardly when the boom is lowered, spring means urging the cradle to return to load-carrying position when unloaded, hydraulic check means operatively connected between said boom and said platform for causing gradual lowering of the boom by gravity when loaded, and spring means connected between said boom and said platform elevating the boom when unloaded.

3. In a vehicle having a platform and a supporting frame, elongated unloading apparatus including an unloading boom pivoted at one end under said platform on said frame and having its other end extending beyond said platform with its intermediate portion under said platform, a cradle pivotally mounted intermediate its sides on the outer end of said boom, means normally holding the cradle in horizontal position said boom being selectively slidable on its pivot for retracting said boom and cradle entirely under said platform, hydraulic check means causing gradual lowering of said boom by gravity when loaded, means causing the cradle to tilt outwardly when the boom is lowered and spring means elevating said boom when unloaded.

4. In a vehicle having a platform and a supporting frame, elongated unloading apparatus including an unloading boom pivoted at one end under said platform on said frame and having its other end extending beyond said platform with its intermediate portion under said platform, a cradle pivotally mounted at its center on the other end of said boom, means normally holding the cradle in horizontal position said boom being selectively slidable on its pivot for retracting said boom and cradle entirely under said platform, means on the cradle for engaging the ground to tilt the cradle outwardly when the boom is lowered, hydraulic check means causing gradual lowering of said boom by gravity when loaded, and spring means elevating said boom when unloaded.

5. In a vehicle having a platform and a supporting frame, elongated unloading apparatus including an unloading boom pivoted at one end under said platform on said frame and having its other end extending beyond said platform with its intermediate portion under said platform, a cradle pivotally mounted at its center on the outer end of said boom, means normally holding the cradle in horizontal position said boom being selectively slidable on its pivot for retracting said boom and cradle entirely under said platform, means on the cradle for engaging the ground to tilt the cradle outwardly when the boom is lowered, spring means acting between said boom and cradle to return the cradle toward load-carrying position when the cradle is unloaded, hydraulic check means causing gradual lowering of said boom by gravity when loaded, and spring means elevating said boom when unloaded.

LEO K. FONDRIEST.
JAMES E. FONDRIEST.

References Cited in the file of this patent

UNITED STATES PATENTS

| Number | Name | Date |
|---|---|---|
| 1,467,504 | Sabarros | Sept. 11, 1923 |
| 1,520,175 | Collins | Dec. 23, 1924 |
| 2,033,243 | Jester | Mar. 10, 1936 |
| 2,127,007 | Paxton | Aug. 16, 1938 |
| 2,350,641 | Ruddock | June 6, 1944 |
| 2,391,412 | Gorton | Dec. 25, 1945 |
| 2,469,321 | Wood | May 3, 1949 |

FOREIGN PATENTS

| Number | Country | Date |
|---|---|---|
| 244,179 | Germany | Mar. 4, 1912 |
| 348,249 | Germany | Feb. 4, 1922 |
| 571,580 | France | Feb. 6, 1924 |
| 12,279/28 | Australia | Mar. 14, 1929 |
| 108,490 | Australia | Sept. 21, 1939 |
| 113,348 | Australia | June 23, 1941 |
| 256,991 | Switzerland | May 4, 1946 |